Aug. 6, 1940.　　　O. C. SCHMIDT　　　2,210,306
CUTTING MACHINE
Filed May 1, 1939　　　5 Sheets-Sheet 1

INVENTOR:
Oscar C. Schmidt,
by H. F. Herbolet
His Attorney

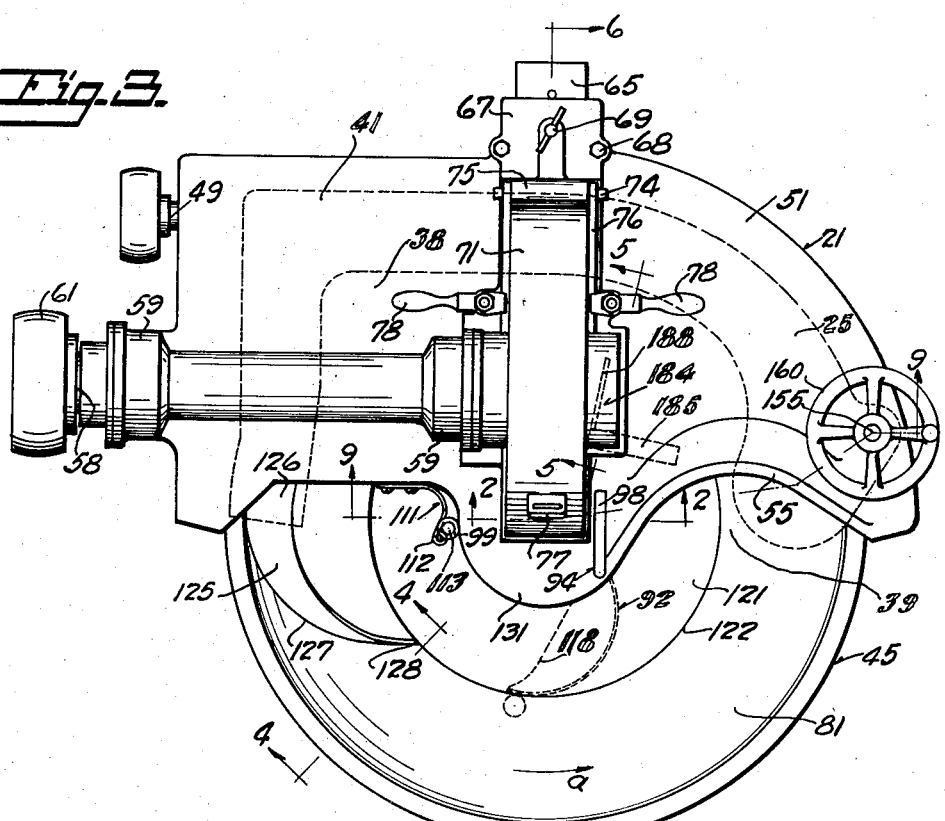

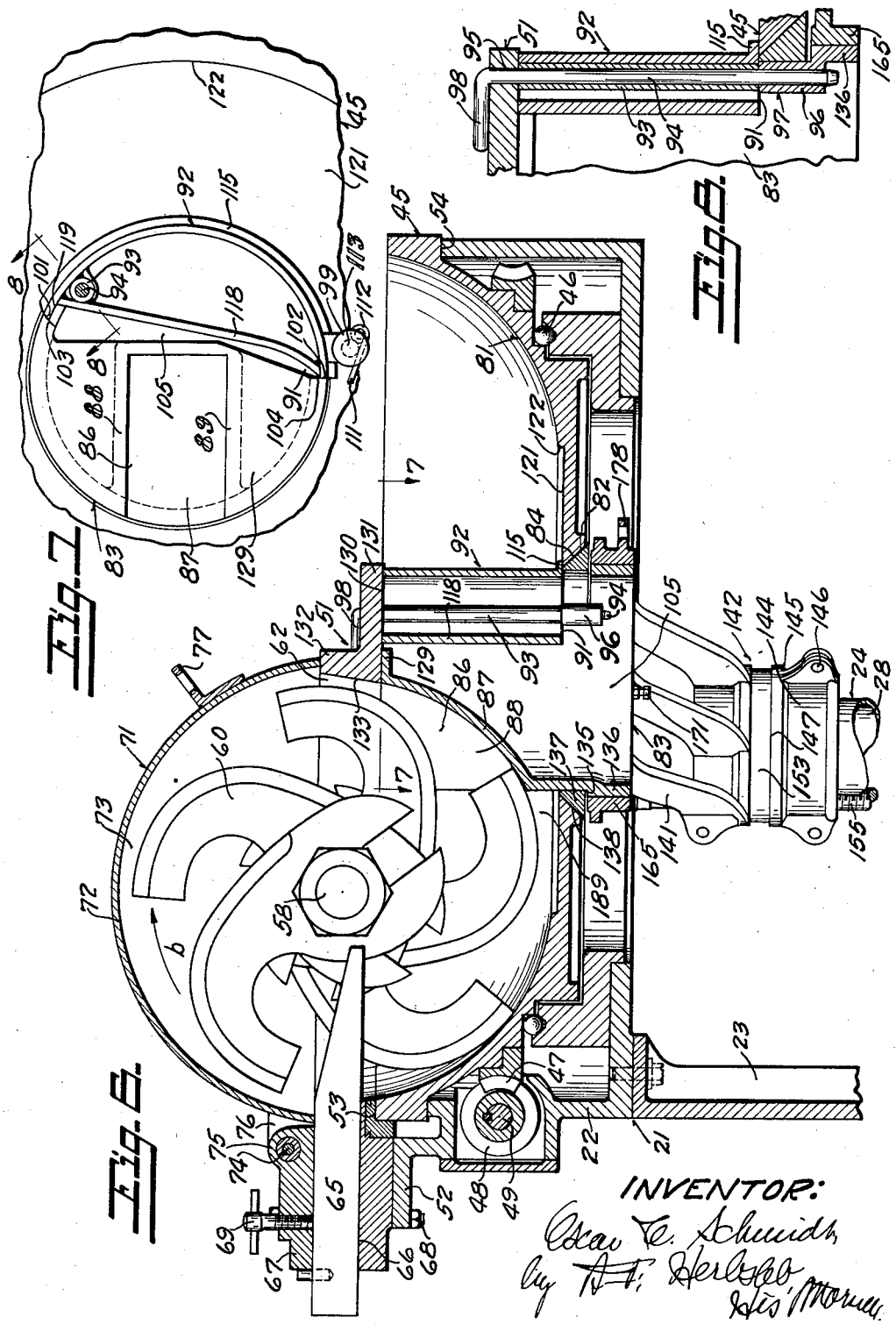

Aug. 6, 1940.   O. C. SCHMIDT   2,210,306
CUTTING MACHINE
Filed May 1, 1939   5 Sheets-Sheet 4
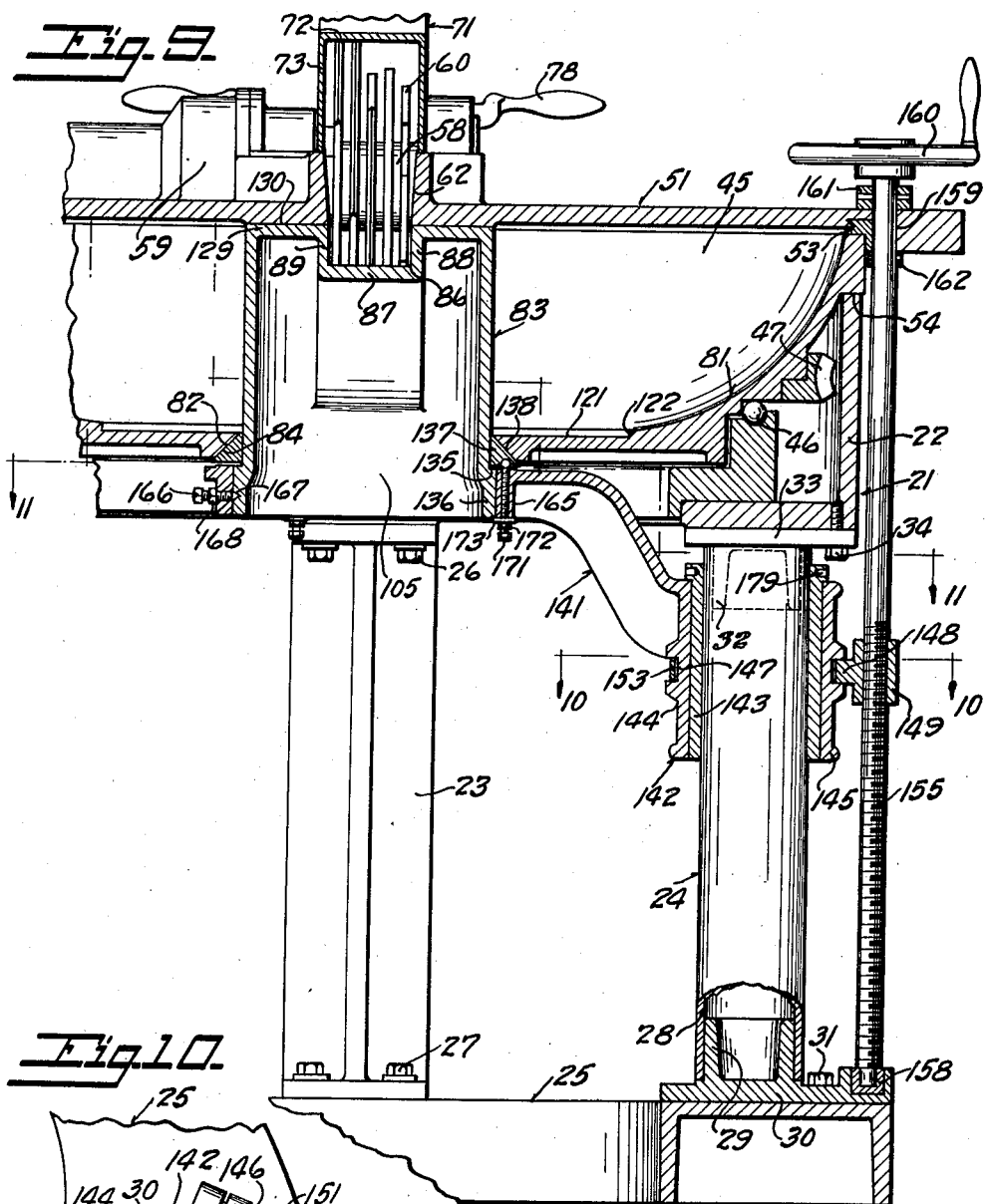
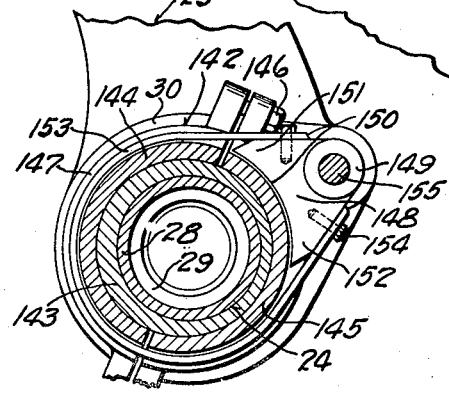
INVENTOR:
Oscar C. Schmidt Aug. 6, 1940.  O. C. SCHMIDT  2,210,306
CUTTING MACHINE
Filed May 1, 1939   5 Sheets-Sheet 5
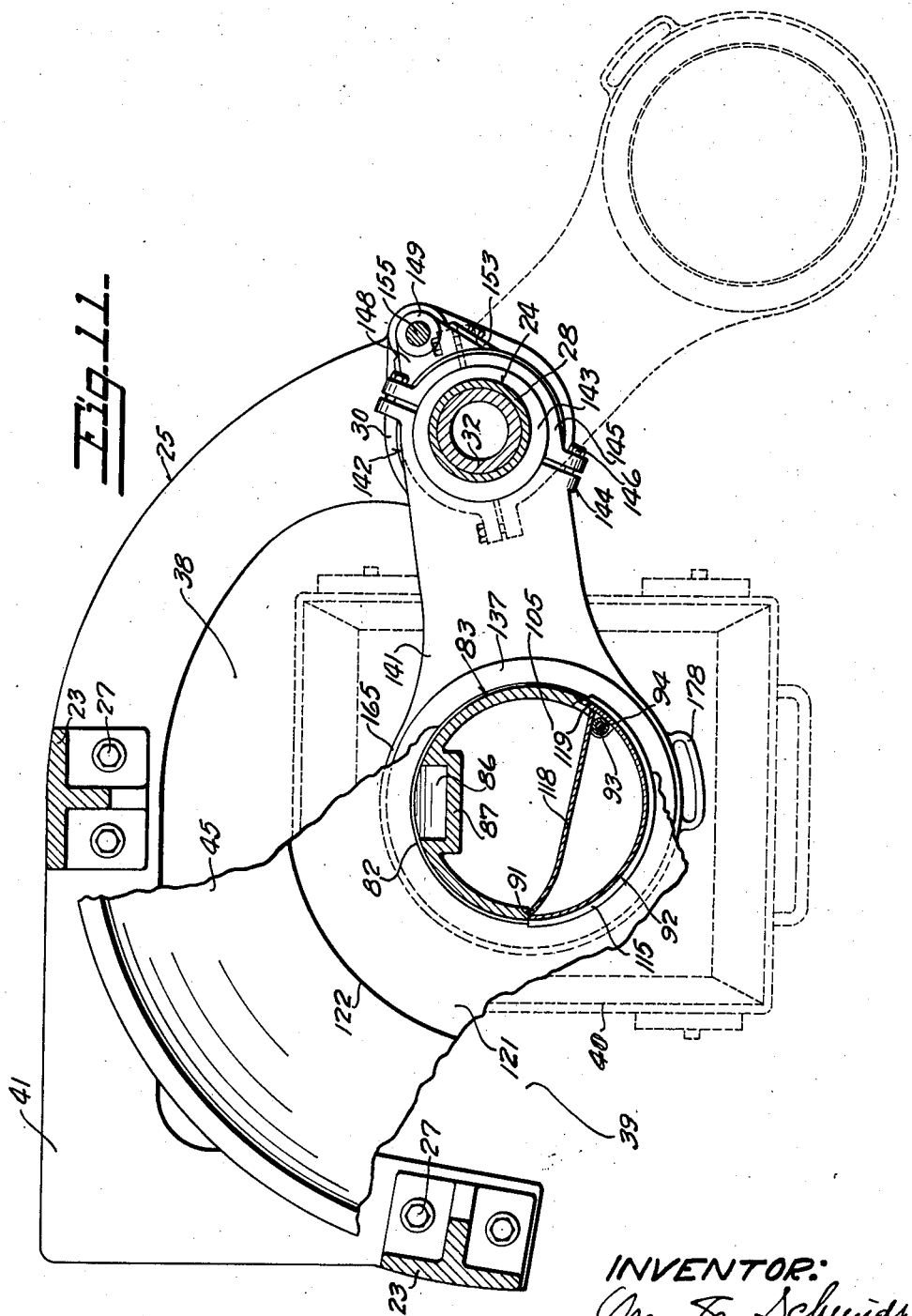
INVENTOR:
Oscar C. Schmidt, Patented Aug. 6, 1940

2,210,306

UNITED STATES PATENT OFFICE 2,210,306

CUTTING MACHINE

Oscar C. Schmidt, Cincinnati, Ohio, assignor to The Cincinnati Butchers' Supply Company, Cincinnati, Ohio, a corporation of Ohio Application May 1, 1939, Serial No. 271,097

24 Claims. (Cl. 146—67)

My invention relates to cutting machines primarily employable in the meat industry, for cutting meats and the like, when preparing the same for use in sausages, meat loaves and other products of a similar nature, although it is employable in other relations in which it is desired to cut, comminute or mince materials.

It is the object of my invention to provide a novel material bowl in a cutting machine; further, to provide novel means for delivering the cut material; further, to provide a novel inner member for a rotary bowl provided with novel discharging means for the cut material; further, to provide a novel inner member for a rotary bowl having a part of the path of the rotary cutting means therein; further, to provide novel supporting means for the inner member; and, further, to provide novel operating means for positioning the latter.

My invention consists in novel means for accomplishing these objects; further, in providing a rotary bowl having a trough, the lower and outer portion of the bottom of which is of arcuate form cross-sectionally of the trough, and an inner member stationarily positioned with relation to the bowl and provided with a recess having a bottom which is arcuate in cross-section and is complemental to the bowl and arranged for receiving rotary cutters acting on the material in the trough; further, in providing an inner member for the trough having a lateral discharge opening through which the cut material may be discharged from the trough inwardly of the trough; further, in providing a closure for said discharge opening; further, in providing an unloader movable into the trough and co-acting with the material contacted portions of the trough and the inner member for directing the cut material through said opening; and, further, in operatively connecting said closure and said unloader so as to operate together for opening the closure when moving the unloader into the trough and for closing said closure when retracting the unloader from the trough.

My invention consists, further, in providing a novel movable inner wall section for the trough which is a closure for a discharge opening in said inner wall; further, in so mounting said closure that when opened it extends into the trough to unload the material in said trough by directing the cut material through an opening in said inner wall; and, further, in providing a material deflector in said trough to direct the material into the range of the opened closure.

My invention consists, further, in providing a rotary bowl having a trough and a central opening, and an inner wall which forms an inner trough member in said central opening arranged to be moved downwardly through the bottom of the bowl; further, in providing said inner wall with a discharge opening and a closure therefor for discharge of the cut material from said trough; further, in providing such inner wall with an arcuate bottom complemental to the arcuate cross-sectional form of the bottom of the bowl for accommodating the path of rotary cutting means operating on the material in said trough; further, in providing a novel adjustable journal joint connection between the normally stationary inner wall structure and the rotatable bowl; and, further, in providing novel means for mounting said inner wall structure and for supporting and moving the same.

My invention will be further readily understood from the following description and claims, and from the drawings, in which latter:

Fig. 3 is a plan view of my improved device.

Fig. 4 is a vertical sectional detail view, showing the outer deflector, taken on the line 4—4 of Fig. 3, and partly broken away.

Fig. 5 is a similar view of the inner plow, the section being taken on the line 5—5 of Fig. 3, and partly broken away.

Fig. 6 is a vertical central sectional view of my improved device, taken on the line 6—6 of Fig. 3, and partly broken away.

Fig. 7 is a cross-sectional view, showing the inner wall structure and its closure and unloader, taken in the plane of the line 7—7 of Fig. 6, and partly broken away.

Fig. 8 is a vertical sectional detail view of the pivot means for the closure and unloader, taken in the plane of the line 8—8 of Fig. 7, and partly broken away.

Fig. 9 is a vertical section of my improved device, showing the mounting means for the inner wall structure, taken on the irregular line 9—9 of Fig. 3, and partly broken away.

Fig. 10 is a detail cross-sectional view of the same, taken in the plane of the line 10—10 of Fig. 9, and partly broken away.

Fig. 11 is a horizontal cross-section of my improved device, taken in the plane of the irregular line 11—11 of Fig. 9, partly broken away, and showing the inner wall structure and its mounting swung outwardly in dotted lines with the inner wall structure located outside the frame, and partly broken away, and showing an unloading truck in unloading position in dotted lines.

Figure 1:
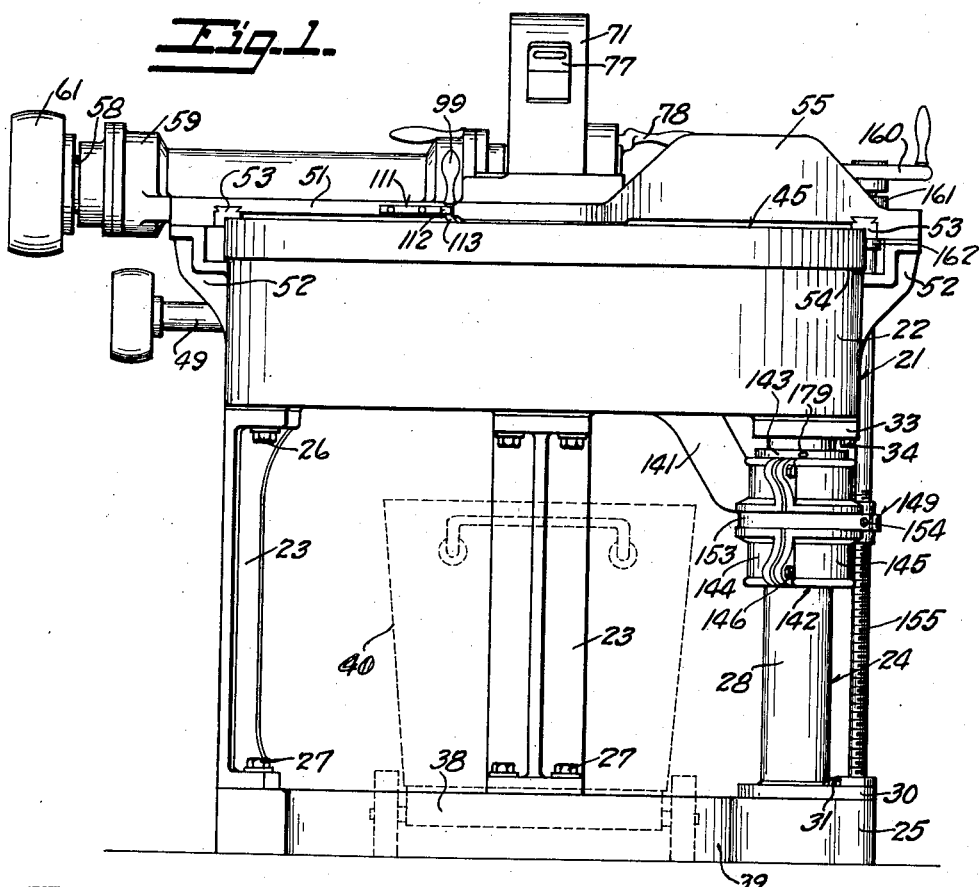
Fig. 1 is a front elevation of my improved device, showing an unloading truck in unloading position in dotted lines.
Figure 2:
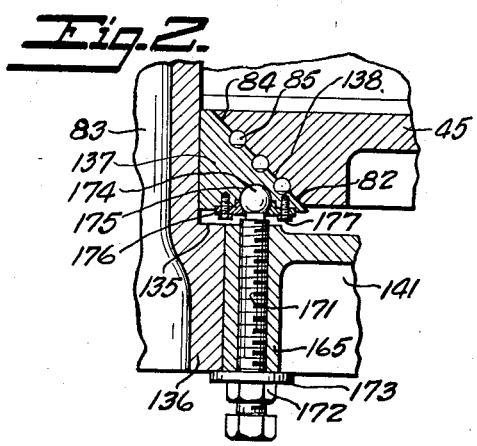
Fig. 2 is a vertical enlarged sectional view of a detail of the mounting means for the inner wall structure, taken on the line 2—2 of Fig. 3.

I do not herein claim the means for rotating the cutters and the bowl and relating the same to the frame; nor the means for mounting and rotating the bowl; nor broadly the means for providing a clear space under the bowl and between the legs of the frame for accommodating a discharge receptacle under the inner discharge from the bowl, nor broadly the provision of an inner discharge, having shown, described and claimed the same in my copending application for improvement in cutting machines, filed in the United States Patent Office on the 21st day of July, 1937, as Serial No. 154,843.

A main frame 21 comprises a housing 22, supported on legs 23 and a post 24, which serves as a leg, (Figs. 1, 9 and 11), the lower ends of the legs and the post being mounted on a base 25. The upper ends of the legs are rigidly secured to the housing by means of bolts 26, and the lower ends of the legs are rigidly secured to the base by bolts 27. The post exemplified comprises a tube 28, the lower end of which is centered about a stub 29 of a stub piece 30, secured to the base by bolts 31, and the upper end of the tube is similarly centered about a stub 32 of an upper stub piece 33, secured to the housing by bolts 34, the tube and stub pieces being rigid with each other.

The base is preferably of substantially U-shaped form in horizontal plane (Figs. 1, 3, 9 and 11) and has a central cavity 38 with which a lateral cavity 39 merges, through which trucks, one of which is shown in dotted lines at 40 in Figs. 1 and 11, may be moved under the inner discharge opening in the trough, hereinafter described, for receiving the discharged material from the trough. The base is shown enlarged outwardly, as at 41, to aid in supporting the same and prevent tilting of the machine.

A rotary bowl 45 is rotatable in the housing and is journaled therein, for instance, on ball bearings 46. (Figs. 6 and 9). It is provided with a ring worm gear 47, with which a worm 48 meshes. The worm is secured to a worm shaft 49 journaled in bearings in the main frame, and is suitably driven. A cover 51 is provided for the rear portion of the bowl (Figs. 1, 3, 6 and 9), and is suitably secured to the main frame, as by being bolted to brackets 52 extending from the housing. The bowl rotates under the cover and there is a suitable joint 53 between the cover and the outer peripheral rim of the bowl. An annular slideway 54 under the bowl may also be provided between the housing and the outer margin of the bowl. When the material moves under the cover it is guided thereunder by the forward, upwardly and forwardly extending infeeding flange 55 at the entrance end of the cover, (Figs. 1 and 3) this flange being bowed toward the center of the trough for directing the material into the trough and under the cover.

A cutter shaft 58 is suitably journaled in bearings 59 on the cover. (Figs. 1, 3, 6 and 9). Cutter blades 60 are suitably secured to the cutter shaft. There is a set of these cutter blades, the cutters of which are arranged in staggered relation about the shaft, so as to act successively on the material in the bowl to cut or comminute the same. The material is fed to the cutters by the bowl, being moved with the bowl in the trough of the bowl. A suitable driving pulley 61 is provided for the cutter shaft, and is suitably driven. The bowl rotates in the direction of the arrow $a$, and the cutters rotate in the direction of the arrow $b$. The cover has a radially extending opening 62 therein in which the upper portions of the rotary cutters operate.

A suitable comb 65 is provided for the cutters, the comb having tongues received between the cutters and at the ends of the set of cutters for cutting action between the cutters and the comb and for clearing the meat or material off of the blades when passing through the comb. The comb is mounted in rearward extension 66 of the opening 62 in the cover, a cap 67 being received over the comb and clamped to the cover and the frame by suitable bolts 68. A clamp 69 coacting with the comb for positioning the same, is threaded in the cap.

A hood 71, having an upper arcuate wall 72 and side walls 73, is received over the cutters and is releasably hinged on the cover by means of a pivot rod 74 in a bearing 75 of the cap 67 and bearings in lugs 76 extending from the hood at the respective ends of the bearing 75. The hood is provided with a handle 77, by means of which it may be raised and lowered with relation to the cutters. Clamps 78 hold the hood in closed position. The hood is located over the upper portions of the cutter blades and the tooth end of the comb 65.

The bowl has an annular wall 81, the lower and outer portions of the inner face of which are arcuate in cross-section, and conform to the circular paths of the cutters while rotating for cutting coaction between the cutters and the rotating bowl. (Figs. 2, 3, 6 and 9.) The bowl is provided with a central opening 82, normally closed by an inner wall 83, which is preferably stationary and forms an inner trough section between which and the bowl there is a journal joint 84 preferably so constructed as to prevent leakage therethrough of meat juices and other fluid contents of the material. The joint is shown of frustoconical form tapering upwardly and inwardly, and as provided with annular packing grooves 85, to arrest seepage of material being cut and its juices past the joint. The inner trough section forms a plug for the central opening in the rotating bowl.

The inner wall is provided with a recess 86 having a bottom 87 which is arcuate in cross-section on a curvature complemental to the curvature of the bowl, for coaction of the cutting edges of the blades therewith. (Figs. 3, 6, 7 and 9.) This recess is located angularly in the inner wall or plug at the position of the cutter blades and part of the paths of the cutters is located in this recess. The recess has side walls 88, 89.

The inner wall is provided with a discharge opening 91 normally closed by a closure 92, which is shown in the form of a gate, and has an outer surface complemental to the shape of the outer surface of said inner wall or inner trough section. This discharge opening is exemplified as extending throughout only an angular portion of said inner wall. The material in the trough which moves with the rotating bowl encounters little frictional resistance from the inner wall and closure while passing from and to the cutter blades.

The closure 92 exemplified is provided with an outer wall which is arcuate about an upright axis, and has an outer face which is a sector of the upright inner material contacted face of the inner stationary portion of the trough. (Figs. 6, 7, 8 and 11.) The closure structure has a pivot bearing 93 at one side thereof rigid with the structure in which a pivot rod 94 is located and about which the closure is arranged to swing. The pivot rod is located in a bearing 95 in the cover 51 and in a bearing 96, in a boss 97 extending inwardly from the stationary inner trough section. The lower end of the pivot rod is tapered to facilitate entry into the bearings, and the upper end thereof is bent to form a handle 98 arranged to rest on the cover to support the rod. The rod is readily removable for release and removal of the closure structure.

The closure structure is provided with a handle 99 at its side opposite to the side at which its pivot is located for swinging the closure structure on its pivot. The pivot for the closure structure or gate is preferably located slightly distanced from one side edge of the gate. The side edges 101, 102 of the gate are arranged to form close connection with the side walls 103, 104 of the outfeeding opening 91 in the inner wall of the trough, so as to prevent leakage into an outfeeding passage 105 extending from the outfeeding opening. The mating faces of the side edge 101 of the gate and the side wall 103 of the opening are preferably on an arc described from the pivotal axis of the gate as its center. The gate is held in closed position by a spring latch, shown as formed of a leaf spring 111, secured to the outfeeding front face of the cover and provided with a spring clip 112 releasably received about the shank 113 of the handle 99 on the gate. An outwardly extending arcuate flange 115 at the lower edge of the gate extends outwardly over the inner arcuate margin of the rotary bowl to form a close joint therewith when the gate is in closed position to prevent leakage of contents from the bowl. The gate is arranged to rest on the inner margin of the bowl when the inner wall structure is lowered to clean the machine.

The closure is provided with an inner deflector wall 118 which serves as an unloader for directing the contents of the bowl into the mouth or discharge opening 91 in the inner trough section. The discharge passage 105 opens downwardly. This unloader and the closure form a combined structure movable together for opening said discharge mouth and deflecting the material in the bowl through said mouth and into said discharge passage. The deflector wall is shown as a plate secured at its respective side edges to the closure, and merging with the inner face of the closure, one end of the closure wall forming a deflecting nose 119 for discharging the material of the trough inwardly into the discharge passage.

In order to permit the lower edges of the closure and unloader to move in a horizontal plane relatively to the bowl, the inner face of the bowl is provided with an annular depression 121 between the arcuate outer face of the bowl and the inner wall as well as the arcuate bottom face of the recess 86 in said inner wall. (Figs. 3, 5, 6 and 9.) This depression has an outer annular margin 122, which is arranged to be contacted by the lower outer edge of the closure when swinging the latter outwardly for limiting outward movement of the closure and unloader when unloading the contents of the trough. When the closure or gate is swung to open position, as represented by the dotted line position in Fig. 3, it extends into the trough with the lower edge of the gate proximate to the bottom face of the depression 121, with the unloader presented at a tangent to a circle within the inner face of the trough to direct the cut material moving with the bowl in the direction of the arrow $a$ through the discharge opening 91 in the inner wall of the trough and thereby unloading the trough.

A deflector 125 (Figs. 3 and 4) has its base 126 secured by countersunk screws to the under face of the cover 51, and projects forwardly and downwardly therefrom into the trough for moving the material in the trough inwardly, the deflector having a lower edge 127, which bears upon the cross-sectionally arcuate face of the bowl. The deflector at its inner edge has a substantially upright inner margin 128, which projects inwardly preferably as far in radial distance as the position of the outer swinging upright margin of the unloader when the closure is open to full extent, so as to direct the cut material in the rotating bowl into the deflecting path of the unloader in order to move all the material in the trough into the discharge passage, providing for quick, efficient and complete removal of the material from the trough. After the material has been discharged the operator closes the closure by pushing inwardly on the handle 99, the shank 113 thereof being automatically received behind the clip 112 of the spring latch for holding the closure in closed position. The deflector 125 also acts during cutting of the material, to move the material inwardly to mix the material and direct it into the path of the cutters.

The inner trough section exemplified comprises the upright normally cylindrical inner wall in which there is the recess for receiving the inner portions of the rotating cutters and the lateral discharge opening normally closed by the closure 92, the outer face of which is a sector of the normal cylindrical face of the inner wall. The bottom arcuate wall 87 of the recess 86 (Fig. 6) forms a separating wall between said recess and the discharge passage 105. The upper end of the wall structure is provided with a top 129 (Figs. 6 and 9), which coacts with the bottom face 130 of the cover, and the cover is provided with a forward extension 131 to cover the inner wall structure and the closure when the latter is closed. The front wall 132 of the opening 62 has a face 133 which coacts with the arcuate face of the bottom of the recess 86 in the inner wall structure and coacts with the cutting edges of the cutters in cutting the meat.

The lower end of the inner wall structure is provided with an annular shoulder 135 (Figs. 2, 6 and 9), formed by an annular enlargement 136 at the bottom of the inner wall structure. The lower or journal member of the journal joint 84 is formed by a journal collar 137 with which the bearing 138 of said joint coacts, this bearing being formed at the inner margin of the bowl.

The inner wall or inner trough structure is preferably supported from the frame 21, and is preferably movable in such manner as to be lowered in the opening 82 in the rotary bowl and to preferably pass through said opening, and to be moved laterally outwardly beyond the bowl so as to expose the same and all joints and material contacted faces thereon and on the bowl and the cover, for thoroughly cleaning all of the parts, thereby also exposing the cutting knives and parts adjacent thereto for cleaning purposes, it being understood that in this art frequent cleaning of all the meat and juice contacted parts is desirable to prevent injury to and contamination of the product, and my improved device provides exceptional facility for such cleaning.

The supporting and moving means for the inner wall structure are shown as an arm 141 (Figs. 1, 2, 3, 6, 9, 10 and 11) swingable about the upright post and arranged to be raised and lowered thereon into suitable elevational positions for coactive relation of the inner wall with the rotary bowl and for moving the same with relation thereto for exposure of the material contacted portions of the same. The arm is provided with a bearing 142, comprising an inner bearing sleeve 143, and an outer clamp bearing 144, arranged to be clamped about the inner bearing sleeve. This outer bearing is shown provided with a bearing cap 145, arranged to be secured to the arm portion of the bearing by bolts 146 for securing the bearing parts together and clamping the bearing to the sleeve. The bearing is provided with an annular groove 147, into which a tongue 148 of an elevating nut 149 extends. The tongue is of substantial width and has an inner arcuate face 150 coacting with the bottom of the annular groove and with side wings 151, 152. A band 153 is located in the annular groove, the ends of the band being secured to the respective wings by bolts 154. The band insures parallelism between the upright axis of the post and the upright axis of the nut 149, and of an elevating screw 155 having threaded connection with the nut.

The elevating screw is stepped at its lower end in a step bearing 158 in the lower stub piece for the post and at its upper end is journaled in a bearing 159 in the cover. The elevating screw is provided with a hand wheel 160 for turning the same. Axial movement of the elevating screw in its bearing is prevented by collars 161, 162, pinned to the elevating screw at the respective ends of its bearing 159.

The inner end of the arm 141 is provided with a supporting bearing 165 in which the enlargement 136 of the inner wall structure is supported. Locating and supporting bolts 166 (Fig. 9) are threaded in the supporting bearing and extend into positioning holes 167 in the enlargement, jam nuts 168 holding the bolts in position. A suitable number of these bolts, preferably three, is arranged about the axis of the supporting bearing.

Adjusting bolts 171 (Figs. 2 and 9) are threaded in threaded holes in the supporting bearing and adjust the elevation of the journal collar 137 with relation to the inner wall for correct coactive relation with the inner margin of the rotary bowl. Jam nuts 172 hold the adjusting nuts in adjusted positions. Washers 173 are clamped between the jam nuts and the supporting bearing and are of sufficient diameter to overlap the lower end of the inner wall structure for aiding in supporting the latter. A suitable number of these adjusting bolts, preferably three, is arranged about the axis of the supporting bearing ring. The upper end of each of the adjusting bolts 171 is preferably provided with a ball formation 174 located in angularly arranged recesses 175 in the journal collar and are held therein by suitable clips 176 fixed to the journal collar by screws 177 for preventing rotation of the journal collar and insuring its movement with the inner wall structure. The arm 141 is provided with a grip 178 which may be grasped by the operator for swinging the arm. The arm may be swung outwardly a sufficient extent to locate the inner wall structure outwardly beyond the rotary bowl.

The bearing sleeve 143 has an outer surface which is eccentric (Fig. 10) with relation to its axis and eccentric with relation to the post about which the bearing sleeve is located. This bearing sleeve is arranged to be adjustably rotated in its bearing 144, the bearing sleeve being provided with seats 179 for the reception of a wrench for the purpose, so as to adjust the distance between the axis of the post 24 and the upright axis of the inner wall structure 83, to center the inner wall structure with relation to the central opening in the rotary bowl, when the inner wall structure is moved for entry into said central opening, and the inner wall structure is located angularly in its swinging bearing 165 of the arm, so that the recess 86 therein registers angularly with the paths of rotation of the cutters 60 when the inner wall structure is in place.

A deflector 184 (Figs. 3 and 5) for the material is provided to deflect the material in the depression 121 out of said depression under the cover immediately in advance of the cutter blades for moving the material therein into range of the cutter blades and into coaction relation with the cross-sectionally arcuate face of the bowl across which the cutters move, in order that any material located in the depression and immediately thereabove is brought into such coactive relation. Such a deflector comprises an attaching base 185 by means of which it is secured to the under face of the cover by suitable screws, a depending shank 186 having an inner edge 187 in contact with the inner wall of the trough immediately in advance of the recess 86 therein, and an outwardly extending foot 188 in the annular recess in the bottom of the rotary bowl so as to scrape said bottom and move any material in said annular recess in outward direction into the sphere of action of the rotating cutters above the coacting arcuate face of the rotary bowl.

This foot extends up and down a distance greater than the depth of said annular recess and the upright distance between the outer end of the bottom of the recess 86 and the bottom of said annular recess, so as to move any material which would otherwise be located in the space 189 (Fig. 6) between the peripheral path of the rotary cutters and the adjacent walls, out of said space into coactive relation between the arcuate wall of the bowl and said rotary cutters. The shank and the foot of this deflector extend substantially tangential to a cylinder within said inner wall.

In operation, the meat or other material to be cut, comminuted or minced is placed into the rotary bowl and is advanced thereby in the direction of the arrow a into coaction with the rotating cutters which rotate in direction of the arrow b, the meat being advanced in feeding direction past the rotative cutters by the rotative movement of the bowl and the progressively staggered relation of the cutters. During such action the closure or gate 92 is in closed position, the material being moved along the arcuate face of the inner wall and of the closure, along which it readily slips. The material in the annular depression of the rotating bowl is moved out of the same in advance of the field of action of the rotary cutters by the deflector 184, so that all of the material is uniformly cut. The material is also moved inwardly in the rotating bowl by the outer deflector 125 so as to mix the material.

When the material has been sufficiently cut, the closure 92 is opened into the path of the advancing material in the rotary bowl and forms an unloader and is provided with an unloader wall slantingly placed across the path of the material for directing the material into the discharge opening or mouth 91 of the unloading passage 105 in the inner wall or plug, the outer deflector 125 in advance of the unloader moving the material at the outer portion of the bowl into the sphere of action of the unloader. Quick and sanitary unloading of the material in the bowl is thereby effected. The material drops through the unloading passage into a suitable receptacle, as the truck 40 (Figs. 1 and 11), located under the unloading passage 105, in the inner cavity 38 of the base and movable thereinto and therefrom through the lateral cavity 39 in said base.

The inner wall is readily dropped out of coactive relation with the cutters and the bowl for thoroughly cleaning the parts, and the inner wall may be lowered sufficiently, by means of the elevating mechanism and the radial arm, to permit its being moved laterally for full exposure of the same, making all parts of the apparatus and the surfaces contacted by meats and juices readily accessible for cleaning purposes, which may be efficiently and economically performed in my improved device. All parts of the mechanism are readily accessible for attention and cleaning, providing an extremely sanitary device.

When dropping the inner wall section in the present exemplification, the lower bearing 96 of the pivot pin 94 (Figs. 6 and 8) moves therewith, leaving the pivot pin supported in the cover and the unloader and closure in place, the lower end of the latter being supported on the inner margin of the rotary bowl by its outer arcuate lower flange 115, and leaving the closure and unloader laterally free for readily cleaning the same. The closure and unloader may, however, be removed by raising the pivot pin 94 and grasping the unloader and closure and moving the same laterally from under the cover. These parts are also readily, quickly and accurately replaced.

My improved device is economical, extremely sanitary, removes the necessity of handling the material, and is simple in construction and operation.

I claim:

1. In a cutting machine of the character described, the combination of a rotary material trough having a central opening, a normally stationary inner wall for said trough in said central opening, rotary cutting means operating in said trough crosswise thereof, said inner wall provided with a discharge passage and a discharge mouth therefor opening into said trough, a closure therefor, and mounting means for said closure and said inner wall for opening said mouth for discharge of the material in said trough through said passage and for lowering said inner wall in said central opening.

2. In a cutting machine of the character described, the combination of a rotary bowl having a material trough, rotary cutting means having cutting paths crosswise of said trough, an inner material supporting wall for said trough provided with a lateral discharge opening for the material, said discharge opening presented laterally toward the interior of said trough and extending only a limited angular distance in said inner material supporting wall, and unloading means for the material movable into said trough for discharge of said material through said lateral opening.

3. In a cutting machine of the character described, the combination of a frame, a rotary bowl having a material trough and rotatable in said frame, a normally stationary inner material supporting wall for said trough, material cutting means rotatable in said trough crosswise thereof, said normally stationary inner wall provided with a recess for accommodating part of the cutting path of said cutting means, said wall provided with a discharge opening, and means normally closing said discharge opening.

4. In a cutting machine of the character described, the combination of a rotary bowl having a rotary material trough, cutting means operating in said bowl transverse to said trough, a normally stationary material supporting wall in the inner portion of said trough, a portion of said normally stationary wall being movable for providing a discharge opening in the inner portion of said trough, and a material unloader to unload the material into said opening having operative connection with said movable portion of said wall.

5. In a cutting machine of the character described, the combination of a frame, a rotary bowl provided with an annular material trough rotatable in said frame, an inner material supporting wall for said trough having a transverse discharge opening therein, a closure for said opening, and means whereby said closure is movable into said trough into open relation for discharge of the material from said bowl.

6. In a cutting machine of the character described, the combination of a rotary bowl having a material trough, material cutting means having a cutting path crosswise of said trough, an inner cylindrical material supporting wall for said trough provided with a limited angular discharge opening for the material, and a closure for said discharge opening normally forming a limited angular part of said wall and movable into said trough for discharging material therefrom.

7. In a cutting machine of the character described, the combination of a rotary bowl having a material trough, material cutting means having a cutting path crosswise of said trough, an inner normally stationary cylindrical material supporting wall for said trough provided with a limited angular discharge opening for the material, and a combined gate and unloader normally forming a limited angular part of said wall and closing said discharge opening and movable into said trough to discharge material therefrom into said discharge opening.

8. In a cutting machine of the character described, the combination of a rotary bowl having a material trough, material cutting means having a cutting path crosswise of said trough, an inner normally stationary material supporting wall for said trough provided with a discharge opening for the material, and a gate for said opening provided with an inner deflector movable into said trough to open said discharge opening and present said inner deflector to the material in said trough to direct the material into said opening.

9. In a cutting machine of the character described, the combination of a rotary bowl provided with a rotary annular trough having an inner annular margin, a normally stationary inner wall for said trough having a discharge opening, cutting means operable crosswise of said trough and said inner wall, a movable closure for said opening, and means for movably supporting said inner wall for downward movement of said inner wall in said inner annular margin.

10. In a cutting machine of the character described, the combination of a rotary bowl provided with a rotary annular trough having an inner annular margin, a cover for a portion of said bowl, a normally stationary inner wall for said trough having a discharge opening, cutting means operable crosswise of said trough and said inner wall, a movable closure for said opening having connection with said cover, and means for movably supporting said inner wall for downward movement of said inner wall in said inner annular margin and relatively to said closure.

11. In a cutting machine of the character described, the combination of a rotary bowl provided with a rotary annular trough having an inner annular margin, a normally stationary inner wall for said trough having a discharge opening, a movable closure for said opening having a lapping joint with said inner annular margin, and means for movably supporting said inner wall for downward movement of said inner wall and in said inner annular margin and relatively to said closure.

12. In a cutting machine of the character described, the combination of an annular trough comprising an outer rotary bowl having an outer cross-sectionally arcuate face and an inner normally stationary wall having a discharge opening and an angularly located recess having an inner cross-sectionally arcuate face, rotary cutting means having a cutting path across said faces, said trough having an intermediate depression between said cross-sectionally arcuate faces, and a combined closure and unloader to selectively close said discharge opening and movable in said depression to deflect the material into said discharge opening.

13. In a cutting machine of the character described, the combination of a rotary bowl provided with a rotary annular trough having an outer cross-sectionally arcuate face, a normally stationary inner wall for said trough having a discharge opening and a recess having an inner cross-sectionally arcuate face, rotary cutting means having a rotary cutting path across said faces, said inner wall having a material contacted face, and a combined closure and unloader provided with an outer material contacted face conforming to the material contacted face of said inner wall when closed and an inner deflecting face to direct the material into said discharge opening when open.

14. In a cutting machine of the character described, the combination of a rotary bowl having an annular material trough provided with an outer annular cross-sectionally arcuate face, a central wall for said bowl having an inner cross-sectionally arcuate face complemental to said first-named arcuate face, a cover for the rear portion of said bowl, rotary cutting means coacting with said arcuate faces and extending into said cover, said bowl having an annular depression between said arcuate faces, and a deflector in said depression under said cover at the feeding-in end of said cutting means to move the material in said depression radially under said cover into the field of cutting action of said cutting means.

15. In a cutting machine of the character described, the combination of a rotary bowl having an annular material trough provided with an annular outer cross-sectionally arcuate face, a stationary central wall for said bowl having an inner cross-sectionally arcuate face complemental to said first-named arcuate face and a discharge opening, rotary cutting means coacting with said arcuate faces, a movable gate normally closing said opening and movable to discharge material from said bowl into said opening, and a deflector at the outer portion of said bowl in advance of said gate to move material in said bowl into the range of discharging action of said gate.

16. In a cutting machine of the character described, the combination of a rotary bowl having an outer cross-sectionally arcuate face, a normally stationary central wall for said bowl having an inner cross-sectionally arcuate face complemental to said outer arcuate face and a discharge opening, rotary cutting means coacting with said arcuate faces, a cover for the rear portion of said bowl, a discharge gate for said discharge opening, a pivot connection between said cover and said discharge gate, and means whereby said central wall is elevationally movable with relation to said cover and said gate.

17. In a cutting machine of the character described, the combination of a rotary bowl provided with an annular material trough having an outer cross-sectionally arcuate face and a central opening, an annular bearing at said central opening, a central inner wall for said trough having an inner cross-sectionally arcuate face and normally located in said central opening, rotary cutting means coacting with said arcuate faces, said central inner wall movable elevationally in said central opening and downwardly away from said rotary cutting means, a journal ring for said annular bearing, and adjusting means to adjust said journal ring elevationally with relation to said central inner wall and said annular bearing.

18. In a cutting machine of the character described, the combination of a frame, a rotary bowl mounted therein, said rotary bowl having an outer cross-sectionally arcuate face and a central opening, a central inner wall for said trough having an inner cross-sectionally arcuate face and normally located in said central opening, rotary cutting means coacting with said arcuate faces, said central wall movable elevationally in said central opening and downwardly away from said rotary cutting means, a supporting bracket in said frame under said bowl having supporting connection with said central inner wall, and elevational adjusting means for said bracket.

19. In a cutting machine of the character described, the combination of a frame, a rotary bowl mounted therein, said rotary bowl having an outer cross-sectionally arcuate face and a central opening, a central inner wall for said trough having an inner cross-sectionally arcuate face and normally located in said central opening, rotary cutting means coacting with said arcuate faces, an upright column in said frame, a supporting bracket on said column having supporting connection with said central inner wall, said supporting bracket movable angularly about the upright axis of said column, and means for raising and lowering said bracket on said column, constructed whereby to raise said central inner wall into operative relation in said bowl and to lower said central inner wall below said bowl and to swing the same away from said central opening.

20. In a cutting machine of the character described, the combination of a frame comprising a base and a housing thereabove, a rotary bowl in said housing, said bowl having a central opening, a normally stationary inner wall structure for said bowl in said central opening, said bowl and said wall structure provided with an annular trough, said wall structure provided with a discharge passage in said central opening for said annular trough, and rotary cutter means operable crosswise in said trough, said frame having a central cavity therein under said central opening extending substantially to the bottom of said base and said base provided with a lateral cavity extending substantially to the bottom of said base and communicating with said central cavity for the passage of an unloading truck through said lateral cavity into said central cavity under said central opening for receiving the material discharged through said discharge passage.

21. In a cutting machine of the character described, the combination of a frame comprising a base and a housing thereabove, a rotary bowl in said housing, said bowl having a central opening, a normally stationary inner wall structure for said bowl in said central opening, said bowl and said wall structure provided with an annular trough, said wall structure provided with a discharge passage in said central opening for said annular trough, rotary cutter means operable crosswise in said trough, said frame having a central cavity therein under said central opening extending substantially to the bottom of said base and said base provided with a lateral cavity extending substantially to the bottom of said base and communicating with said central cavity for the passage of an unloading truck through said lateral cavity into said central cavity under said central opening for receiving the material discharged through said discharge passage, an upright post between said base and said housing, and an elevating bracket supported by said post and having operative connection with said inner wall structure and extending into said central cavity when lowering the same.

22. In a cutting machine of the character described, the combination of a rotary bowl having a material trough, rotary cutter blades having cutting paths crosswise of said trough and a central normally stationary material supporting wall for said trough extending upwardly in said trough from the bottom portion of said trough and about which said bowl rotates and provided with a lateral discharge opening for the material opening into and toward said trough from within said central wall.

23. In a cutting machine of the character described, the combination of a rotary bowl having an annular material trough, a rotary cutting means operating in said trough crosswise thereof, a movable plug extending upwardly from the lower portion of said rotary bowl and provided with an annular material supporting face for the trough, said movable plug having a coacting face for the cutting means and a discharge opening for the cut material, said coacting face and said discharge opening interrupting the annulus of said annular material supporting face and respectively extending only a limited angular distance in said movable plug at different radial positions about said plug.

24. In a cutting machine of the character described, the combination of an annular trough comprising an outer rotary bowl having an outer annular cross-sectionally arcuate face and an inner normally stationary cylindrical wall having a lateral discharge opening presented toward the interior of said trough and an angularly located recess having an inner cross-sectionally arcuate face within the annulus of said outer cross-sectionally arcuate face, said discharge opening and said recess each extending only a limited angular distance in said inner wall and being angularly separated from each other, rotary cutting means having a cutting path across said arcuate faces, a closure for said discharge opening, and an unloader coacting with said rotary bowl to move the material through said opening.

OSCAR C. SCHMIDT.